United States Patent [19]

Vigil et al.

[11] Patent Number: 4,516,043
[45] Date of Patent: May 7, 1985

[54] METHOD AND APPARATUS FOR GENERATING ELECTRICAL ENERGY FROM A HEATED GAS CONTAINING CARBON PARTICLES

[75] Inventors: Samuel A. Vigil, San Luis Obispo, Calif.; Rick B. Spielman, Albuquerque, N. Mex.

[73] Assignee: The Regents of the University of California, Berkeley, Calif.

[21] Appl. No.: 440,170

[22] Filed: Nov. 8, 1982

Related U.S. Application Data

[63] Continuation-in-part of Ser. No. 197,550, Oct. 16, 1980, abandoned.

[51] Int. Cl.³ .............................................. H02K 45/00
[52] U.S. Cl. ...................................................... 310/11
[58] Field of Search ............................ 310/11, 10, 300

[56] References Cited

U.S. PATENT DOCUMENTS

| | | | |
|---|---|---|---|
| 1,443,091 | 1/1923 | Petersen | 310/11 X |
| 3,211,932 | 10/1965 | Hundstad | 310/11 |
| 3,268,746 | 8/1966 | Crown et al. | 310/11 |
| 3,278,798 | 10/1966 | Fabre et al. | 310/11 |
| 3,355,605 | 11/1967 | Okress | 310/11 |
| 3,467,842 | 9/1969 | Carrasse | 310/11 |
| 3,508,086 | 4/1970 | Allport et al. | 310/11 |
| 3,524,086 | 8/1970 | Lindley | 310/11 |
| 3,531,665 | 9/1970 | Rosa | 310/11 |
| 3,603,822 | 9/1971 | Petsinger | 310/11 |
| 3,622,817 | 11/1971 | Isaacson | 310/11 |
| 3,708,704 | 1/1973 | Zauderer | 310/11 |
| 3,720,850 | 3/1973 | Way | 310/11 |
| 3,725,737 | 4/1973 | Lawson et al. | 310/11 X |
| 3,736,447 | 5/1973 | Zauderer | 310/11 |
| 3,873,860 | 3/1975 | Bergman et al. | 310/11 |
| 3,895,243 | 7/1975 | Amend et al. | 310/11 |
| 4,107,557 | 8/1978 | Shepard | 310/11 |
| 4,163,910 | 8/1979 | Matthews et al. | 310/11 |
| 4,200,815 | 4/1980 | Petrick et al. | 310/11 |
| 4,336,469 | 6/1982 | Wysk | 310/11 |
| 4,345,173 | 8/1982 | Marchant et al. | 310/11 |
| 4,346,317 | 8/1982 | Fernandes | 310/11 |

Primary Examiner—Donovan F. Duggan
Attorney, Agent, or Firm—Phillips, Moore, Lempio & Finley

[57] ABSTRACT

Carbon particles entrained in the gas flow into a magnetohydrodynamic generator are electrostatically charged from a source of high voltage and then function as charge carriers in the MHD process. Lower flow temperatures may be used and seeding with alkali metal salts is unnecessary as the MHD process becomes independent of thermal ionization of constituents of the gas flow.

10 Claims, 2 Drawing Figures

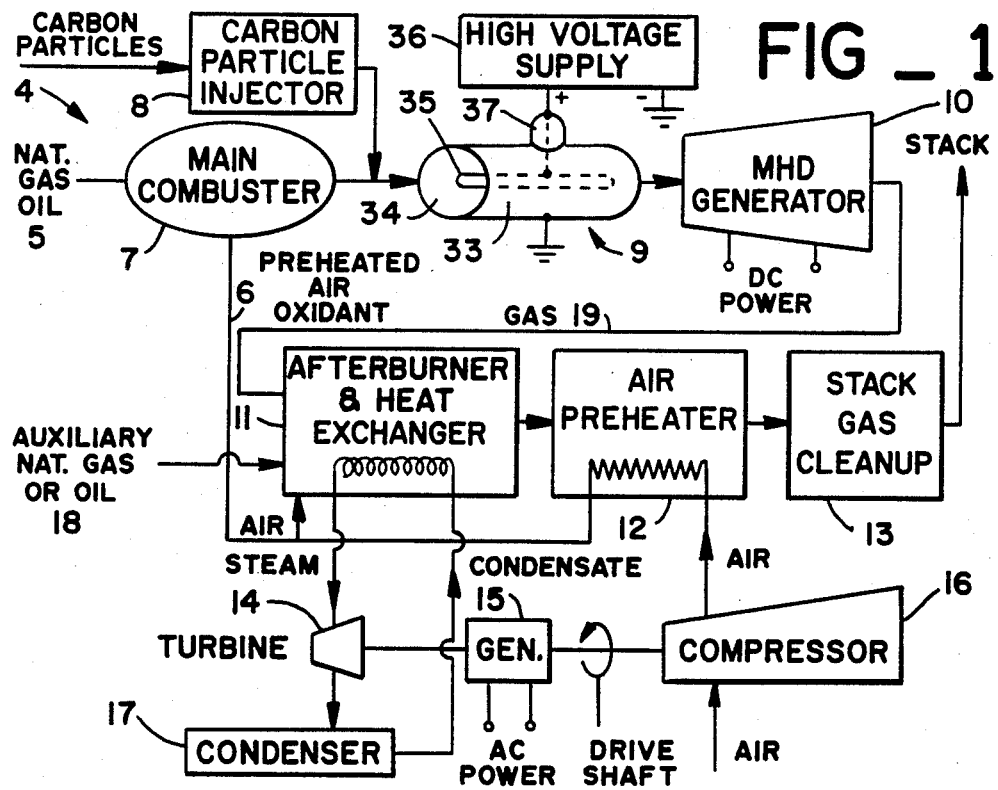
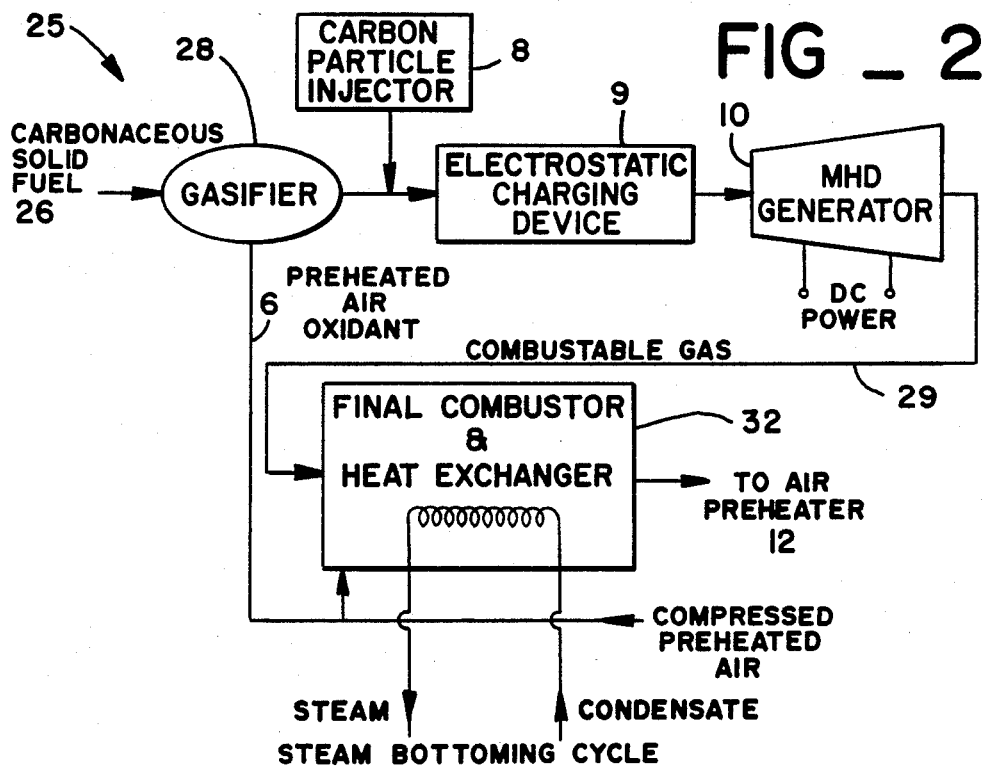

METHOD AND APPARATUS FOR GENERATING ELECTRICAL ENERGY FROM A HEATED GAS CONTAINING CARBON PARTICLES

CROSS REFERENCE TO RELATED APPLICATION

This application is a continuation-in-part of our co-pending application Ser. No. 197,550 filed Oct. 16, 1980, now abandoned and entitled Method and Apparatus for Generating Electrical Energy from a Heated Gas Containing Carbon particles.

TECHNICAL FIELD

This invention relates generally to energy generation systems and more particularly to magnetohydrodynamic generators and to steam electric generating systems.

BACKGROUND OF THE INVENTION

Magnetohydrodynamics (hereinafter abbreviated as MHD) is the branch of physics which deals with the interactions between ionized gases and magnetic fields. Prior MHD generators operate by passing a flow of partially ionized gas, a plasma, through a transversely oriented magnetic field. The interaction of the electrons in the plasma with the magnetic field creates a current flow nearly perpendicular to both the gas flow and the magnetic field. When the gas is contained within a duct or channel whose walls are electrically isolated from each other, a DC electrical potential is formed on the walls. The charged walls (electrodes) can be connected to an external electrical load.

MHD power generating systems typically operate on an open cycle. The extremely high temperatures necessary to form a plasma are generated by burning any of various fossil fuels in heated air or oxygen. The plasma in prior MHD generators of this type is produced by thermally induced dissociation of gas molecules or atoms into free electrons and ions.

The level of ionization in the plasma is governed by the Saha equation:

$$\frac{N_i}{N_n} = 2.4 \times 10^{15} \frac{T^{3/2}}{N_i} e^{-U_i/RT}$$

where:

$N_i/N_n$ = ratio of ions to neutral gas molecules or atoms
$U_1$ = ionization temperature of the gas
K = Boltzmann's constant
T = temperature in degrees Kelvin Thus in these prior MHD systems the degree of ionization is highly dependent on the gas temperature. This form of ionization is termed "equilibrium ionization" as recombination of the plasma is balanced by the creation of new charged particles. Very high gas temperatures have heretofore been required in order to achieve an adequate degree of equilibrium ionization. This has complicated the structure and added to costs, by dictating the use of expensive refractory materials for example, and has also made it difficult to utilize economical low grade fuels.

Even at the highest working temperatures (approximately 2730° C.), the amount of ionization produced by thermal dissociation of combustion gas molecules is insufficient to raise the conductivity of the gas to a level usable in an MHD generator. Therefore "seed materials" which ionize more easily, such as the alkali metals, are added. In practice less expensive alkali salts are used rather than pure metals.

However the addition of alkali salts such as potassium carbonate, potassium sulfate, or potassium hydroxide causes problems. The amount of seed material that needs to be added is substantial, typically 2-10% of the input fuel weight. Since these seed materials are expensive, they must be recovered. Without seed recovery, prior MHD generators of this kind will not be cost effective compared to conventional fossil fueled steam electric generating plants. Satisfactory seed recovery technology has not yet been developed, at least for large scale operations.

MHD power generators are being proposed as topping cycles to conventional steam electric power plants. In such an application the hot gases which are used in the MHD channel are produced by the direct combustion of natural gas, coal, or fuel oil. Direct combustion of gas or oil in an MHD generator system is straightforward although such fuels are costly. The direct combustion of coal generates fly ash, which at the high temperatures used in MHD, melts and forms a slag coating on the inside walls of the MHD channel. The slag reduces the efficiency of the MHD channel and can cause premature failure of the channel.

As an alternative to direct combustion, solid fuels such as coal or biomass (e.g. wood, agricultural wastes or the like) or municipal solid wastes can be converted to a gas, which can be burned to provide the hot gases for the MHD channel. In the simplest type of gasification process, air gasification, carbonaceous fuels are partially combusted with air to generate a low energy gas rich in carbon monoxide and hydrogen, with an energy content of approximately 6.0 MJ/m³. Although the low energy gas has only about one sixth the energy content of natural gas (approximately 37 MJ/m³), the low energy gas can be used to fuel boilers, gas turbines and internal combustion engines. However due to the low energy content of the gas, it must be used near the site of its production. Air gasifiers for both coal and biomass fuels are in commerical production.

A more complex gasification process, oxygen gasification, utilizes pure oxygen to produce either a medium energy gas (12.9 to 13.8 MJ/m³) or a "pipe-line quality" high energy gas (also called syngas) with an energy content similar to that of natural gas. Although medium or high energy gas can be transported long distances in existing natural gas transmission pipelines, it is more costly to produce than low energy gas. Also, oxygen gasifiers for medium and high energy gas operate at lower energy conversion efficiencies than the simpler air gasifiers for low energy gas.

Thus steam electric power plants of this kind are subject to cost and efficiency problems which can be alleviated if a less costly MHD topping cycle, adaptable to any of a variety of fuels and which does not require seeding with alkali metals, is available.

The present invention is directed to overcoming one or more of the problems set forth above.

SUMMARY OF THE INVENTION

In one aspect of the present invention, apparatus for generating electrical energy has a magnetohydrodynamic generator which produces electrical energy from the kinetic energy of a gas flow by interaction with electrical charge carriers in the flow, a gas source which directs the gas flow into the magnetohydrodynamic generator and has means for entraining carbon particles within the gas flow. The apparatus further includes means for establishing a gas flow temperature in the generator that is below the temperature at which thermal ionization of constituents of the flow occurs. Electrostatic charging means provide the charge carriers by transferring electrical charge from a source of high voltage to the carbon particles as the gas flow travels into the generator.

In another aspect the invention provides a method for generating electrical energy which includes the steps of directing a flow of gas and carbon particles into a magnetohydrodynamic generator to produce electrical energy from the kinetic energy of the flow and establishing electrical charge carriers in the flow for interaction with the magnetohydrodynamic generator. The method includes the further steps of maintaining the gas flow in the magnetohydrodynamic generator below the temperature at which thermal ionization of constituents of the gas flow occurs, imparting electrostatic charge to the carbon particles by transferring electrical charges from a source of high voltage to the particles, and utilizing the electrostatically charged carbon particles as the charge carriers which interact with the magnetohydrodynamic generator.

As the invention provides charge carriers in an MHD generator without relying on thermally induced dissociation of gas molecules into ion and free electrons for the purpose, a more economical and efficient operation may be realized. Seeding with alkali metal and structural complications for recovering the seed material are unnecessary. Operating temperatures may be substantially lower than has heretofore been the practice enabling use of less costly structural materials and use of economical low grade fuels.

Additional aspects, objects and advantages of the present invention can be obtained by a study of the drawings, the disclosure and the appended claims.

BRIEF DESCRIPTION OF THE DRAWINGS

FIG. 1 is a schematic diagram of one embodiment of the present invention.

FIG. 2 is a schematic diagram of an alternative embodiment of the present invention.

DETAILED DESCRIPTION OF THE PREFERRED EMBODIMENTS

FIG. 1 illustrates apparatus 4 for generating electrical energy in accordance with a first embodiment of the invention. The apparatus 4 includes a main combustor 7 that produces a flow of hot gases. The main combustor 7 is operated at less than stoichiometric conditions so that production of microscopic carbon particles is enhanced. In other words, a rich fuel/air mixture is used. The particles are used as charge carriers for the MHD generator 10 as further described below and make the addition of potassium, cesium or other ionizable seed materials unnecessary. The carbon particles preferably have a mean diameter of between about $0.02 \times 10^{-6}$ m to $0.04 \times 10^{-6}$ m and are of sufficient number to provide for a charge density per cubic meter of about $2 \times 10^{18}$ within the generator 10 when the particles are electrostatically charged as will hereinafter be described in more detail.

If the process of generating carbon particles in the main combustor 7 does not produce a sufficient density of charge carriers for the MHD generator 10, then additional carbon particles are inserted into the gas flow out of the combustor from an external source with a carbon particle injector 8 of known construction. The microscopic carbon particles can be externally produced by techniques used in the manufacture of carbon black for the rubber industry, for example.

The fuel 5 used in the main combustor 7 is chosen for its mixing and combustion characteristics. Ideal fuels are gaseous or liquid fuels such natural gas or fuel oil. These fuels produce relatively clean combustion products and can produce the required number and size of carbon particles when combusted at less than stoichiometric conditions. An additional advantage to liquid or gaseous fuels is that they do not produce slag which can foul the MHD generator 10 as can occur in the direct combustion of coal.

The oxidant 6 which is used in the main combustor 7 in this example is air. The air is preheated in an air preheater 12 by heat exchange with hot gases from MHD generator 10 that have passed through a steam cycle heat exchanger 11. If more elevated combustion temperatures and/or higher efficiencies are desired, then pure oxygen or a mixture of air and oxygen is used as the oxidant 6.

The flow of hot gas, together with the entrained carbon particles from the main combustor 7, is directed into an electrostatic charging device 9 that positively charges the carbon particles. The charging device 9 may be essentially similar to the electrostatic precipitators that are used to remove fly ash and other particulates from stack gases.

Such a charging device 9 may, for example, include an electrically conductive cylinder 33 defining the wall of the flow passage 34 through the device and which is electrically grounded. A tubular high voltage electrode 35 extends along the axis of cylinder 33 and is connected to an adjustable high voltage supply 36 through an insulator 37 mounted in the cylinder wall. Cylinder 33 and electrode 35 are formed of refractory metal such as tantalum or tungsten for example. While a positive high voltage supply 36 is used in this embodiment, electrostatic charging of the carbon particles may also be realized by applying negative high voltage to the electrode 35. In large installations the charging device 9 may include more than one of the cylinders 33 each having an axial high voltage electrode 35, the flow of hot gas and carbon particles being temporarily divided into parallel flows through each of the cylinders.

Other forms of electrostatic charging means 9, such as devices of the kind having grids of thin parallel high voltage wires extending transversely to a flow of gas and particulate matter, may also be employed.

A corona discharge is initiated between electrode 35 and the inner wall surface of cylinder 33 by applying a sufficiently high voltage to the electrode from supply 36, the voltage for such purpose being dependent on factors such as the spacing between electrode 35 and cylinder 33 and gas composition, temperature and pressure but typically being around 20 kilovolts.

The corona discharge ionizes the gas in the region between electrode 35 and cylinder 33 and the resulting ions impart an electrostatic charge to the carbon particles by charge exchange. The gas ionization does not persist to a significant extent after the flow leaves the charging device 9. Recombination of such ions with free electrons occurs rapidly as the gas flow temperature is well below that needed to sustain equilibrium ionization. Thus the momentary ionization or plasma formation which occurs within the charging device 9 does not serve to provide the electrical charge carriers required for operation of the MHD generator 10. Instead, it is the electrostatically charged carbon particles which function as charge carriers in generator 10. This enables MHD power generation without the high gas temperature needed to sustain ionization and without the costs and complications involved in introducing and then recovering ionizable alkali metal seed material.

As described above, the hot gases from the electrostatic charging device 9 are directed into the MHD generator 10 which may be of known structural configuration although as herein described the charge carriers to which the generator reacts are carbon particles rather than the conventional plasma of ions and free electrons. Such generators 10 produce electrical energy, in the form of DC current, from the kinetic energy of the gas stream by processes well understood within the art. One important feature of the MHD generator 10 of this invention is that it is operated at temperatures of between about 1500° C. and 2500° C. These temperatures are substantially lower than the elevated temperatures heretofore required in MHD generators. This lower operating temperature is made possible because the gas temperature itself is no longer relied upon to provide charge carriers by thermal ionization of the flow gases. Charge carrier density in the MHD generator 10 is not determined by temperature. It is a function of the carbon particle density in the gas flow and the voltage which is applied to the electrostatic charging device 9.

The combustion gases 19 from the MHD generator 10 are directed into an afterburner and heat exchanger 11. Here, the carbon particles are removed from the flow by combustion, preheated air and additional fuel 18 being supplied to the afterburner. This method may nearly eliminate significant air pollutants from the exhaust gases of the system, but additional cleanup of the stack gases can be conducted if necessary by air pollution control devices 13 of known construction such as baghouses or electrostatic precipitators.

The afterburner/heat exchanger 11 may be constructed and operated in the same manner as a conventional steam boiler fueled with natural gas or fuel oil. The heat in the combustion gases 19, including both heat produced from carbon particle combustion in the afterburner 11 and the remaining heat from the main combustor 7, generates sufficient steam to run steam turbine 14 which is connected to a condensor 17. The steam cycle can be either saturated or superheated and is commonly called a steam bottoming cycle. The steam turbine 14 powers an electrical generator 15 and an air compressor 16. The air compressor 16 draws atmospheric air and directs it through the air preheater 12 prior to insertion into the afterburner/heat exchanger 11 and the main combustor 7.

Operating parameters for a 100 MW electric power plant of the above described form are as follows:

| OPERATIONAL SUMMARY FOR A 100 MW POWER PLANT | |
|---|---|
| 1. Combustion Parameters: | |
| a. Thermal Input to Apparatus (4) | 250 MW |
| b. Fuel: Natural Gas (5) | $1.6 \times 10^4$ Kg/hr |
| c. Oxidant: Air (6) (less than stoichiometric) | $2.5 \times 10^5$ Kg/hr |
| d. Air Preheat Temperature (6) | 1200° C. |
| e. Combustion generated Carbon (7) | 475 Kg/hr |

| -continued OPERATIONAL SUMMARY FOR A 100 MW POWER PLANT | |
|---|---|
| Particles (mean diameter $0.02$–$0.04 \times 10^{-6}$ m) | |
| f. Output Temperature (7) | 2200° C. |
| g. Pressure (7) | 5 atmosphere |
| h. Exit Mach Number (7) | 0.75 |
| 2. Electrostatic Charging Parameters: | |
| a. Working Voltage (9) | 20 kV |
| b. Flow Pressure Drop in Charging Device (9) | negligible |
| c. Charge Density | $2 \times 10^{18}$ m$^{-3}$ |
| 3. Power Plant Efficiencies: | |
| a. MHD Topping Cycle (10) | 10–12% |
| b. Steam Bottoming Cycle (14–17) | 33% |
| c. Overall Plant (4) | 40–42% |

FIG. 2 illustrates electrical power generation apparatus 25 in accordance with a second embodiment of the present invention. This embodiment uses economical carbonaceous solid fuels 26, such as coal, biomass (wood, agricultural wastes for the like) or municipal solid wastes, that are combusted with preheated air in a solid fuel gasifier 28 of known construction. The gasifier 28 produces a hot combustible gas which has an energy content of approximately 6.0 MJ/m$^3$ and contains a large amount of carbon particles. Alternatively, oxygen or mixtures of oxygen and air can be used in the gasifier 28 with or instead of the preheated air 6 to produce a medium or high energy gas.

If the number of carbon particles produced by the gasifier 28 is insufficient, additional carbon particles from an external source are added by the injector 29. The carbon particles entrained in the hot combustible gas flow are charged in the electrostatic charging device 9 and the gas passes through the MHD channel 10 as described in connection with the first embodiment.

Referring still to FIG. 2, the gas 29 leaving the MHD channel 10 is a hot combustible gas containing carbon particles and having an energy content of between about 6.0 MJ/m$^3$ and 37.0 MJ/m$^3$. This combustible gas is combined with preheated air and burned under stoichiometric conditions in a final combustor 32 of known construction. Because the gas 29 itself is combustible, it is not necessary to add supplementary fuel to the final combustor 32 as in the afterburner 11 of the embodiment of FIG. 1. Referring again to FIG. 2, this final combustion consumes the carbon particles entrained in the gas and provides heat for the steam bottoming cycle and the air preheater 12 which may be similar to the corresponding components of the previously described system of FIG. 1.

While the invention has been described with reference to specific examples, it should be understood that many variations are possible and it is not intended to limit the invention except as defined in the following claims.

We claim:
1. In apparatus for generating electrical energy having a magnetohydrodynamic generator which produces electrical energy from the kinetic energy of a gas flow by interaction with electrical charge carriers in said flow, a gas source which directs a gas flow into said magnetohydrodynamic generator, and means for entraining carbon particles within said gas flow, the improvement comprising:
   means for establishing a gas flow in said magnetohydrodynamic generator having a temperature below the temperature at which thermal ionization of constituents of said gas flow occurs and wherein non-equilibrium ionization is insufficient to provide an adequate amount of said charge carriers within said magnetohydrodynamic generator, and electrostatic charging means for providing said charge carriers in said gas flow by transferring electrical charge from a source of high voltage to said carbon particles to impart an electrostatic charge thereto as said gas flow travels into said magnetohydrodynamic generator.

2. The apparatus set forth in claim 1 further including afterburner means for receiving said gas flow from said magnetohydrodynamic generator and for burning said carbon particles, and supplementary generation means for using heat produced by said afterburner means to produce additional electrical energy from said burning of said carbon particles.

3. Apparatus as set forth in claim 1 wherein said gas source is a carbonaceous fuel combustor having means for producing at least a portion of said carbon particles in said gas flow by burning said fuel at less than stoichiometric conditions and means for delivering said gas flow including said carbon particles to said magnetohydrodynamic generator.

4. The apparatus set forth in claim 1 wherein said means for entraining carbon particles within said gas flow includes means for injecting carbon particles from an external source into said flow prior to sid transfer of electrical charge to said particles.

5. The apparatus set forth in claim 1 wherein said electrostatic charging means establishes an electrical corona discharge in the path of said gas flow between said gas source and said magnetohydrodynamic generator to impart said electrostatic charge to said carbon particles.

6. In a method for generating electrical energy which includes the steps of directing a flow of gas and carbon particles into a magnetohydrodynamic generator to produce electrical energy from the kinetic energy of said flow, and establishing electrical charge carriers in said flow for interaction with said magnetohydrodynamic generator, the improvement comprising:

establishing gas flow conditions in said magnetohydrodynamic generator wherein the temperature of said gas flow is below the temperature at which significant thermal ionization of constituents of said gas flow occurs and wherein non-equilibrium ionization is insufficient to provide an adequate amount of said charge carriers, imparting electrostatic charge to said carbon particles by transferring electrical charges from a source of high voltage to said carbon particles, and utilizing said electrostatically charged carbon particles as said charge carriers which interact with said magnetohydrodynamic generator to produce said electrical energy.

7. The method of claim 6 including the further steps of burning said carbon particles following passage of said flow through said magnetohydrodynamic generator, and generating additional electrical energy from the heat produced during burning of said carbon particles.

8. The method set forth in claim 6 including the further steps of producing said gas flow by burning a carbonaceous fuel, producing at least a portion of said carbon particles by burning said fuel at less than stoichiometric conditions and transmitting said gas flow including said carbon particles through said magnetohydrodynamic generator.

9. The method of claim 8 including the further step of injecting additional carbon particles into said gas flow prior to said electrostatic charging of said carbon particles in said gas flow.

10. The method of claim 6 wherein said step of imparting said electrostatic charge to said carbon particles includes passing said particles through an electrical corona discharge.

* * * * *